United States Patent [19]

Klingel

[11] Patent Number: 4,679,201
[45] Date of Patent: Jul. 7, 1987

[54] FOLDED $CO_2$ LASER

[76] Inventor: Hans Klingel, Teckstr. 91, 7141 Möglingen, Fed. Rep. of Germany

[21] Appl. No.: 745,539

[22] Filed: Jun. 17, 1985

[30] Foreign Application Priority Data

Jun. 16, 1984 [DE] Fed. Rep. of Germany ....... 3422525

[51] Int. Cl.$^4$ ............................................. H01S 3/03
[52] U.S. Cl. ........................................ 372/61; 372/62
[58] Field of Search ....................... 372/61, 55, 62, 63

[56] References Cited

U.S. PATENT DOCUMENTS

4,470,144 9/1984 Sano et al. ........................... 372/61

Primary Examiner—Gene Wan

[57] ABSTRACT

A folded longitudinal flow $CO_2$ laser with an output of at least several hundred Watts, having a rectilinear tube device of dielectric material containing $CO_2$, comprising a plurality of individual tubes between end flange devices, disposed serially per fold path. At least one intermediate flange device supports the individual tubes and is aligned with the end flange devices. The intermediate flange device has a gas connecting aperture and a cavity aligned with the individual tubes and the gas connecting aperture, and there is a gas tight sealing device between the intermediate flange device and the individual tubes. A supporting device, which is flexurally-resistant, extends parallel to the longitudinal axis of the laser and has two end zones which are rigidly fixed in the end flange devices in a flexurally-resistant fashion and without clearance. The intermediate flange device is carried by the supporting device in such a manner that it is moveable lengthwise relative to the supporting device to the extent required by heat expansion. And, the individual tubes are supported in such a manner that the are moveable relative to said end flange devices and said intermediate flange device to the extent required by heat expansion.

35 Claims, 12 Drawing Figures

FOLDED CO₂ LASER

The invention relates to a folded longitudinal-flow $CO_2$ laser, and more particularly to a $CO_2$ laser having a retilinear tube device of dielectric material and a solid metallic end flange device at each end zone of the tube device. These lasers have a flange end portion in each of the end flange devices extending substantially at right angles to the geometric longitudinal axis of the laser, with apertures for the tube device end zones, a cavity in each of the end flange devices which communicates with the tube device, deflecting mirrors accommodated by the cavity, a gas connecting aperture in each of the end flange devices which communicates via the cavity with the tube device, gas-tight sealing devices between said tube device end zones and said flange end portions, high frequency electrodes extending longitudinally relative to the tube device, and a mechanical supporting device for the end flange devices.

BACKGROUND OF THE INVENTION

Such lasers are within the category of molecular lasers. They operate almost always continuously. Despite the fact that $CO_2$ has given them their name, other substances, such as, for example, $N_2$ are represented in substantially higher percentages. The mixture of gases may consist, for example, of 10% $CO_2$, 20% $N_2$ and 70% He.

At around 15%, the efficiency of the $CO_2$ laser is relatively high. Its wavelength is around 10.6 micrometers and is thus in an atmospheric "window". In consequence, it can also be guided over considerable distances in the atmosphere with minimal damping. If it is desired to use the laser beam to cut through relatively thick metal plate, then with the current state of the art, cutting must be carried out in an oxygen atmosphere, because lasers which are not subsidized, but which are sold industrially at a profit, only give off energy continuously in a kilowatt range.

Vital to the quality of cutting is the distribution of the laser beam energy over its cross-section. Truly ideal is the mode of zeroth order, also referred to as the Gaussian mode and characterized by a very homogeneous Gaussian distribution. This mode also imitates the peripheral form of a machine tool, such as for example, a drill, a milling tool, a nibbler or the like, so that not so very much cogitation is required in this respect.

Laser beams can be deflected, of course, by mirror movements and so create patterns on the material which is to be machined, or they may, of course, pass completely through the material. Here, too, it is possible to work more easily with the circular beam because the reflection of a circle is more easily monitored than the reflection of complicated figures.

For equal energy, the mode of zeroth order also has a smaller cross-section than modes of a higher order. This means for instance that it is possible for the mirrors, too, to be made smaller. Also, it is easier to forecast how a mirror surface will behave when reflecting a mode of zeroth order.

Whether a mode of zeroth order is approximately or entirely achieved depends less upon the constancy of interval between the mirrors participating in the resonance. Instance, the essential criterion here is the deviation of the mirror reflection from parallelity in relation to the geometrical longitudinal axis of the laser. This deviation may have several sources. Naturally, manufacturing faults play a part. Another contributing factor is whether such lasers have a length which falls in the meter range. Here, the statically produced sag caused by the earth's attraction may play a part. Machine tools are also subject to all manner of vibrations of the most widely diverse amplitude and frequency whether they are generated by the machine tool which is equipped with the laser or whether they are caused by other machinery, vehicles, lifts or the like. In those cases, too, there are deviations from the ideal mode. Above all, though, the energy wasted gives rise to deviations of curvature from the geometrical longitudinal axis. This is due to the following consideration which is based on magnitude: let us assume that the electrical energy supplied to a laser is 3 kilowatts. The laser beam emitted is assumed then to have an effective output of 500 Watts. The energy irradiated is then, in terms of magnitude, around 2.5 kilowatts. If a laser is switched on when work commences, then the mode may initially be correct. With increasing heating-up of the mechanical supporting device, the mode tends increasingly towards a mode of higher order which may perhaps not be noted, if at all.

A disadvantage of current lasers is, too, the fact that their energy cannot be multiplied while retaining essential structural principles. Each laser is a specialist in its own field.

OBJECT AND STATEMENT OF THE INVENTION

The object of the invention is to indicate a laser of the type mentioned at the outset which retains its mode both in respect of constant and also of dynamic load variables and which nevertheless, by being of modular construction, permits of adaptation to the machining problem and which can be produced at prices which allow for a profit under the competitive conditions of the open market.

According to the invention, this problem is resolved by the following features:

said tube device comprises a plurality of individual tubes between said end flange devices, disposed serially per fold path, at least one intermediate flange device supports said individual tubes and is aligned with said end flange devices, said intermediate flange device has a gas connecting aperture, said intermediate flange device has a cavity aligned with said individual tubes and said gas connecting aperture, a gas tight sealing device is provided between said intermediate flange device and said individual tubes, said end flange devices have peripheral zones, said supporting device is flexurally-resistant and extends parallel to said longitudinal axis and has two end zones which are rigidly fixed in said peripheral zones in a flexurally-resistant fashion and without clearance, said intermediate flange device is carried by said supporting device in such a manner that said intermediate flange device is moveable lengthwise relative to said supporting device to the extent required by heat expansion, and said individual tubes are supported in such a manner that said individual tubes are moveable relative to said end flange devices and said intermediate flange device to the extent required by heat expansion.

A plurality of individual tubes per fold path are both more favorable for assembly and also less expensive. They make it possible to discharge the used gas earlier and to supply cooled gas earlier than would be possible with a continuous tube.

By providing intermediate flange devices between the end flange devices—also referred to as mirror heads—it is possible to sub-divide the laser path and nevertheless no mirrors are required at the sub-divisions. By allocating the task of mirror reflection to the end flange devices—otherwise than with intermediate flange devices—and by allocating to the intermediate flange devices—otherwise than with the end flange devices—the task of supplying electrical energy and of supplying and discharging gas, the internal construction of the flange devices becomes visibly simple.

The location of the end flange devices in relation to one another is determined only by the stability of the supporting device on the one hand and by their connection to the end flange devices, while the intermediate flange devices are—in their length—connected to the supporting device in "floating" fashion and do not initially tension these in any condition of operation. The supporting device can thus fully utilize its rigidity. In the same way, the individual tubes do not represent a loading on the supporting device, either.

Only by making the supporting device longer and, instead of using an intermediate flange device, by using three or correspondingly more of them is it possible to increase the emitted energy of the laser. It is then necessary only to adapt the supporting device to the new length.

Advantageously, the invention includes the following additional features.

The tube device is disposed symmetrically of said geometrical longitudinal axis. By virtue of this feature, the individual tubes will, if at all, only exert a symmetrical force on the end flange devices and the intermediate flange devices. They will give off the radiated heat symmetrically. They will be evenly exposed to the action of the fluids, whether these are gases or oils. Thus, also the inner design in the end flange devices and the intermediate flange devices will become less complicated, the supply of electrical energy becomes simpler as will also be the assembly and maintenance.

The individual tubes are composed of inorganic glass. As a result of this feature, the processes in the individual tubes can be observed. As a dielectric material, glass is resistant to the fluids present inside and outside. Its expansion is minimal. Since the glass is a hollow circular cylinder, its properties are readily foreseeable. The glass automatically has a very smooth surface so that no shifts occur with regard to the thermally floating mounting because components used for sealing purposes, such as for example O-rings, will despite the sealing pressure, move relatively easily in relation to the glass.

The individual tubes are of equal length. By virtue of this feature, only identical individual tubes will need to be kept in stock, each individual tube contributing equally to the generation of heat loss, generation of effective energy and to expansion parameters. In particular, this then encourages the modular construction of the laser, according to the energy desired.

These properties are further optimised. The individual tubes have the same inside and outside diameter and are of the same material.

The intermediate flange device has a high frequency connection and connecting lines extend from said intermediate flange device to said high frequency electrodes. These features provide for systematic division of work between the end flange devices and the intermediate flange devices. Furthermore, the end flange devices become even more solid thereby because they do not have to incorporate cut-outs for the high frequency connection. Whether the high frequency connection shifts by heat expansion or not is immaterial.

The high frequency electrodes lie symmetrically with planes that pass through said geometrical longitudinal axis and said individual tubes each have inner and outer high frequency electrodes, and wherein the outer electrode of an individual tube is connected by a common outer ring to a first of said connecting lines, and the inner electrode of an individual tube is connected by a common inner ring to a second of said connecting lines. These features simplify assembly, permit an even laser energy generation and heat irradiation while permitting simple energy distribution.

The common inner ring is folded like a star having as many points as there are associated individual tubes, the end zones of the points being disposed between adjacent tubes while the flanks of each of said star points follow the circular segments of said inner electrodes. These features quite substantially simplify the even supply of energy and furthermore this construction—like the construction described just above—will virtually not interfere with the flow of a cooling fluid. On the contrary, the electrodes and/or the rings can be used as baffles for the fluid.

The outer contours of said end flange devices are substantially circularly cylindrical in relation to said geometrical longitudinal axis. By reason of this feature, the end flange devices also merge into a configuration which makes it possible more easily to obtain a zeroth order mode over a period of time, as well.

The same applies with regard to the contribution made. The outer contours of said intermediate flange device is substantially circularly cylindrical in relation to said geometrical longitudinal axis.

The supporting device has means for providing a constant-temperature fluid for maintaining said supporting device at desired temperature. By virtue of this feature, the desired mode is maintained also over a long time despite varying temperature parameters. It has however been found that a fluid is not needed if the supporting device is, for example, open, like a cage, and if the laser only operates within the range of deciminutes.

The fluid is air. The feature means that the laser is lightweight and that leaks do not have very much importance.

The fluid is transformer oil. The feature results in a flashover-free intensive and even-cooling effect.

The fluid is water. By virtue of this feature, optimum cooling is possible, the fluid is inexpensive and it is possible as always to observe the interior of the individual tubes. Furthermore, electrical screening is obtained.

The supporting device comprises a plurality of circularly-cylindrical, axially-parallel rods, said rods having end zones fixed to said end flange devices at the same angular spacing from one another, and wherein said intermediate flange device has two radial collars spaced apart from each other, and said rods traverse said radial collars in a non-tilting manner. These features provide a simple, easily-assembled, inexpensive, readily accessible supporting device which readily permits of the mode and the modular construction.

Three rods are provided. By reason of this feature, despite observing minimal tolerances, the supporting device is not statically over-determined. In principle, of course, the electrical energy should be fed to the intermediate flange devices, a gas connection is required and possibly a connection for a cooling fluid. These three supply connections or discharge connections can then be readily provided in the space between the three rods.

Four rods are provided. As a consequence, the above-mentioned advantages are substantially retained, with the possibility of adaptation to an instance where two diametrically opposed cooling fluid connections are available. The two diametrically opposed connections prevent asymmetrical heat effects.

The supporting device is an internally finely-machined supporting tube, the end zones of which are rigidly secured to said end flange devices, and wherein said supporting tube has cut-outs for connectors of said intermediate flange device, and said intermediate flange device has radial flanges for securing said intermediate flange device in said supporting tube. As a result, an extremely flexurally resistant supporting device is obtained. Because it is finely machined on the inside, the intermediate flange devices are free to move longitudinally with sufficient ease despite peripheral tightness. Furthermore, at least two available radial flanges prevent any tendency of the intermediate flange device to tilt within the tube.

The cut-outs are round. This feature means that the cut-outs can be made more easily and are also less critical in respect of heat stresses and the behavior of the tube is more easily predictable.

The cut-outs are circular. This applies to an even greater extent when the cut-outs are circular.

The intermediate flange device has circular connectors. By reason of this feature even with very small cut-outs in the tube, the connectors can be screwed on once the relevant end flange device is located in the tube.

The connectors are at the same angular intervals. The feature prevents any irregular weaknesses in the cross-section of the tube in specific angular segments.

Two diametrically opposed connectors are provided for laser gas and a third connector is provided for said high frequency electrodes. Construction according to this feature has been found to be very successful in practice.

A connector is provided for fluid. The feature means that each zone can be individually cooled.

The supporting tube is a standard hydraulic tube. The feature represents a quite considerable contribution to the keenness of the price without sacrificing any technical requirements. Such hydraulic tubes are used for example in earth moving machines, hoists and the like, can be bought by the meter and cut to the desired length. They are always honed on the inside and in most cases, in fact, to a fit of H 7.

At least two mirrors are provided in said end flange device, each of said mirrors having a base traversing a wall of said end flange device, said base and said mirror having an adjusting device, with said wall as an abutment. As a result of these features, it is possible subsequently easily to correct the laser beam to its resonance path.

The adjusting device comprises both a tilting portion and a longitudinal adjustment portion. The features mean that adjustment is particularly simple, because of course there are always at least two mirrors to move which are at an angle of 45° to each other so that for instance one only takes over longitudinal adjustment while the other takes over tilting adjustment, with freedom of choice of what is adjusted with which mirror.

The adjusting device comprises three adjusting screws disposed around the middle of said base. Adjustment is made particularly simple as a result.

The abutment can be constructed particularly easily when the adjusting screws are thrust screws.

Hard metal inserts composed of a metal harder than said end flange devices are embedded in said end flange devices, and said thrust screws have end faces bearing on said hard metal inserts. The features mean that aluminum or the like can still be used for the end flange device, without however giving rise to any signs of wear at the pressure points.

The adjusting screws are disposed at equal angular intervals around a center. The features mean that the effect of adjustment is particularly easy to monitor.

The adjusting device comprises adjusting screws and a spring pretensioning device operating against the direction of action of said adjusting screws. The features ensure provision of a particularly simple abutment which operates over a wide range of adjustment.

The spring pretensioning device comprises a thrust spring, a screw head, and a bore, and wherein said thrust spring is braced at one end against said screw head and at its other end against the bottom of said bore. The features save on additional components which would be necessary if there were a draw spring.

DESCRIPTION OF THE DRAWINGS

The invention will now be described with reference to preferred examples of embodiment illustrated in the attached drawings, in which.

DETAILED DESCRIPTION

Figure 1:
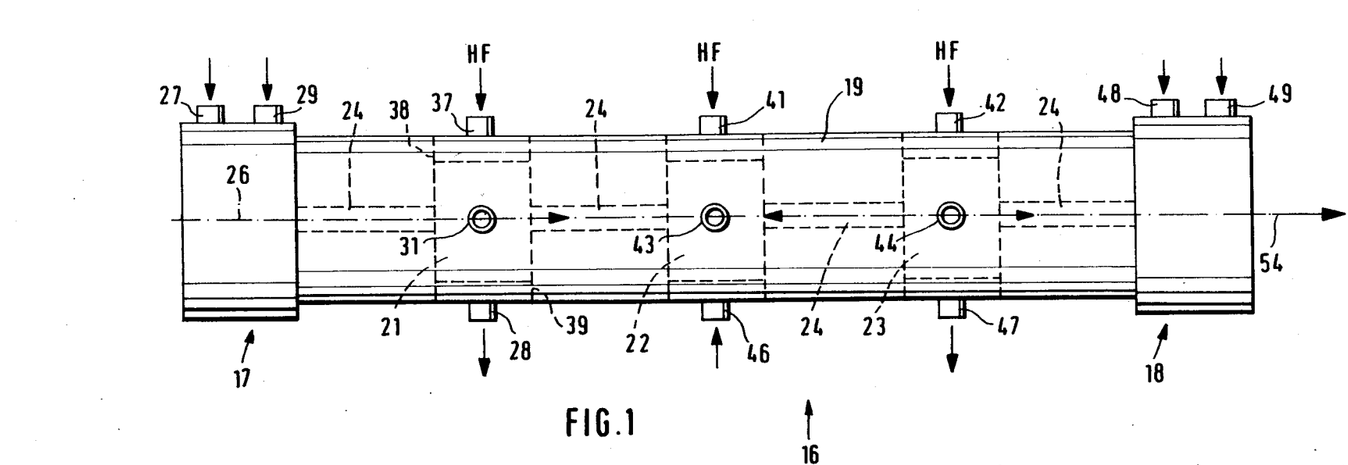
FIG. 1 is a highly simplified front view of the invention with a modular construction.

A laser 16 comprises a left-hand end flange device 17, a right-hand end flange device 18, a supporting device 19, intermediate flange devices 21, 22, 23 provided in the supporting device 19 and an in each case portionally extending tube device 24. Vital to the construction of the laser 16 is a geometrical longitudinal axis 26.

Serving for cooling purposes, transformer oil is fed to the end flange device 17 through a connection 27, emerging in a heated state again at the connection 28 of the intermediate flange device 21. Through a connection 29, there is fed to the end flange device 17 laser gas which flows through that part of the tube device 24 which is located between the end flange device 17 and the intermediate flange device 21. The heated gas emerges at two connections 31, of which one projects upwardly out of the plane of the drawing in FIG. 1 while the other projects downwardly. In the end flange device 17 are two 45° mirrors 32, 33, a concave mirror 34 curved to a radius of 10 meters, the mirrors reflecting a beam 36 into the tube device 24 as shown in principle in FIG. 4.

High frequency energy of 13 or 27 megahertz is fed to the intermediate flange device 21 through a connection 37 at which the power level of the energy is 2.5 to 6 kilowatts.

The intermediate flange device 21 has a left-hand radial flange 38 and a right-hand radial flange 39. With these flanges 38, 39, the intermediate flange device 21 is positioned on the supporting device 19 in relation to the geometrical longitudinal axis 26, but can however move along this with a translatory movement through distances which entail changes in temperature, whether the supporting device 19 changes its length—which would probably represent the main influencing factor—or the intermediate flange device 21 changes its length, whether it is that part of the tube device 24 which is right over on the left-hand side changes its length.

The other intermediate flange devices 22, 23 are of identical construction and are in the laser 16 disposed in the same spatial location as the intermediate flange device 21. None of the intermediate flange devices 21, 22, 23 contains a mirror. The intermediate flange device 22 has high frequency energy of the same frequency fed to it through a connection 41 while the intermediate flange device 23 has high frequency energy of the same frequency fed to it through a connection 22. Laser gas is fed to the two connections 43 and discharged from the two connections 44. The laser gas fed to the connections 43 emerges partially from the connections 31 and partially from the connections 44.

For cooling purposes, oil is fed to a connection 46 of the intermediate flange device 22 and emerges partially from the connection 28 of the intermediate flange device 21 and partially from the connection 47 of the intermediate flange device 23. The intermediate flange devices 22, 23 are connected to the supporting device 19 in the same way as the intermediate flange device 21, i.e. they are mounted in floating fashion on the supporting device 19 to move as the result of heat expansion. The amounts of such movements are of the order of tenths of a millimeter.

Like the end flange device 17, so the end flange device 18 is also rigidly connected to the right-hand end zone of the supporting device 19. Through a connection 48, oil is fed to it and re-emerges at the connection 47. Furthermore, through a connection 49, laser gas is fed to it and emerges again at connection 44. Disposed in the end flange device 18 are two 45° mirrors 51, 52 which reflect the laser beam according to FIG. 4. The mirror 53 is flat, reflects the major part of the laser beam back into the resonance path and allows about 20% of it to emerge as a working beam 54.

Since mirror surfaces are less consumed by cool gas than by hot gas and since the end flange devices 17, 18 accommodate the mirrors, cool gas is fed to but is not substantially extracted from the end flange devices 17, 18 through the connections 29, 49. This circumstance also means that it is possible only to provide an odd number of intermediate flange devices. Therefore, there is one or there are three or five or seven, etc., intermediate flange devices.

The end flange devices 17, 18 are light since on the one hand they incorporate cavities, still to be discussed, and since on the other they consist of an aluminum alloy. In principle, the same applies to the intermediate flange devices 21, 22, 23. The supporting device 19 is of steel and can be best only negligibly with regard to the length of the laser 16, so that the geometrical longitudinal axis 26 is retained, in fact both under thermally differing operating conditions and also under static loadings such as for example sag or, in respect of the weight of the feed to the various connections, the forces of gravity, etc.

This guarantees that the various mirrors always retain the angular position to which they have one been adjusted. The cross-section of the working beam 54 looks as shown in the top left-hand part of FIG. 2 and does not have the configuration of a higher order as shown by the other three cross-sectional representations in FIG. 2. There would then be little or no energy particularly in the core region, the cross-section would be in some cases greater and the workpieces machined would not have such smooth cut surfaces if the working beam 54 is used for cutting.

Figure 3:
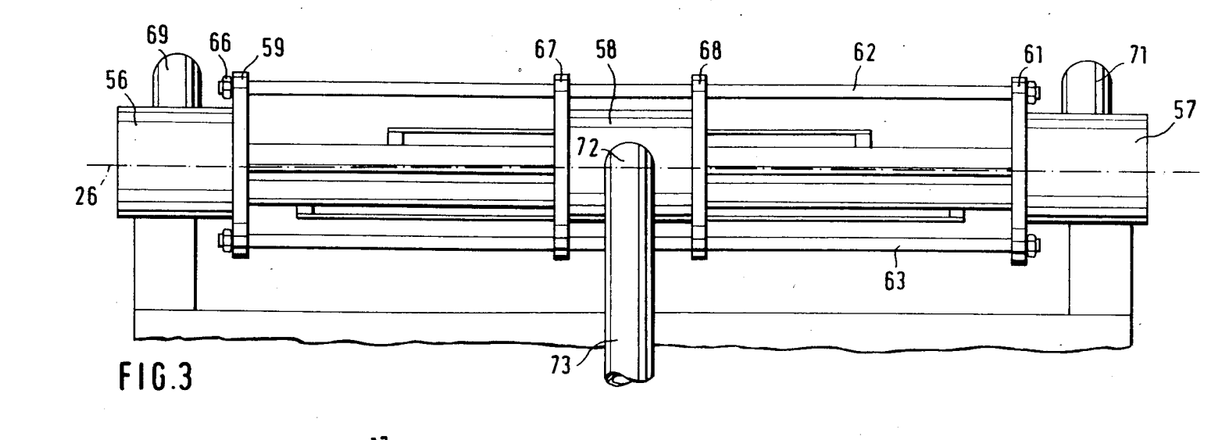
FIG. 3 is a front view similar to FIG. 1 of an actually constructed laser but with two groups of discharge paths.

The less diagrammatic view in FIG. 3 shows a left-hand substantially circularly cylindrical end flange device 56 and a similar end flange device 57 with an intermediate flange device 58. Here, the end flange devices 56, 57 do not have any connections such as for oil, because ambient air is the means of carrying away the lost power. The end flange devices 56, 57 have on the mutually facing sides and extending beyond what is otherwise their periphery a fixing flange 59, 61 which is positioned at a right-angle to the geometrical longitudinal axis 26. In their protruding zone, the fixing flanges 59, 61 have through bores aligned in the longitudinal direction and staggered in respect of each other by in each case 90°. These bores are traversed by four circularly cylindrical metal rods 62, 64 of which the end zones are rigidly fixed to the fixing flanges 59, 61 by screws 66. For connection times within the minutes range, these metal rods 62, 63, 64 may be solid. For longer connection times, they must be constructed as tubes and a cooling fluid must flow through the cavity within them so that their heat expansion remains constant. The metal rods 62, 63, 64 may consist for example of steel or an invar material.

Corresponding to the fixing flanges 59, 61, the intermediate flange device 58 has two identically outwardly projecting radial fixing flanges 67, 68 which have for the straight metal rods 62, 63, 64 bores aligned with the bores in the fixing flange 59, 61. The fit between the bores in the fixing flanges 67, 68 on the one hand and the diameter of the metal rods 62, 63, 64 is such that the geometrical longitudinal axis 28 may indeed be aligned but at least in the magnitude of heat expansion the intermediate flange device 58 is longitudinally displaceable as a guide with the metal rods 62, 63, 64. The gas is fed to the end flange devices 56, 57 via connections 69, 71 and is extracted through two diametrically opposed connections 72. A flexible tube 73 or a correspondingly shaped tube—one for each connection 71, 72—extracts the gas.

Figure 11:
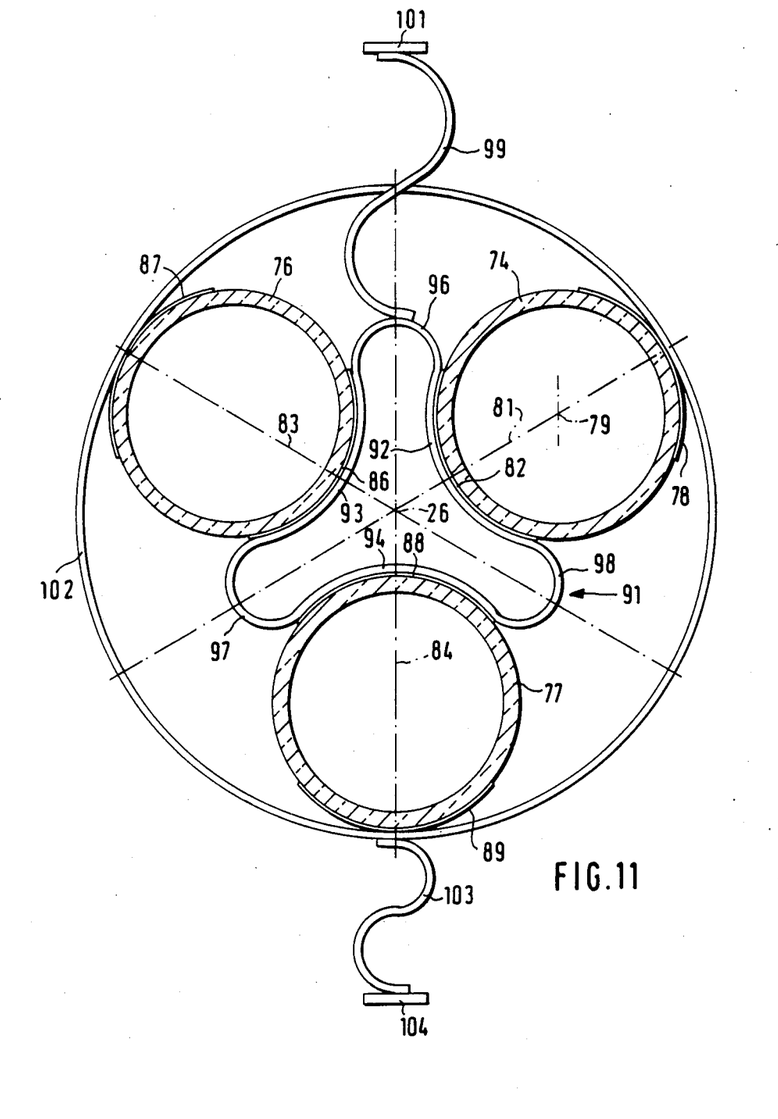
FIG. 11 is a section through a tube device.

The gas flows through the tube device 24 which FIG. 11 shows in the configuration preferred for all examples of embodiment. It is the principle of this configuration that the individual tubes 74, 76, 77 are disposed serially with each resonance beam path. Therefore, the folded beam paths are not located in a single tube.

A triplet combination of single tubes also has the advantage that the end flange devices 17, 18 are not overloaded with jobs. If there are even number of individual tubes in the configuration, then in the same end flange device in which the confex mirror 34 is located, there must also be the mirror 53 which serves for disengagement. On the other hand, if the configuration involves an odd number, then one end flange device is used only for deflection while the other is used for deflection and to a certain extent disengagement.

In the case of a quad combination, the geometrical longitudinal axis 26 occupies substantially more area to emit power loss than in the case of a triplet combination. A quintuplet combination would in terms of mirror arrangement indeed make the end flange devices 17, 18 desirably simple, but the construction would be disproportionately more complicated and larger in diameter if the minimum gaps between units are to be maintained. However, if there is no need to fear this difficulty, any type of fold is in principle feasible.

FIG. 11 shows parallel and angularly symmetrical with the geometrical longitudinal axis 26 the individual tubes 74, 76, 77 of glass which have an outside diameter of 20 mm and a wall thickness of 2 mm.

According to FIG. 11, the individual tube 74 is at the top in contact with an annular electrode 78 of copper plate which extends virtually over the entire length available between the fixing flange 59 and the fixing flange 67. Naturally these are not contacted. Viewed as from the geometrical longitudinal axis 79 of the individual tube 74, the electrode 78 according to FIG. 11 extends over about 100° in fact symmetrically of the central plane 81 which extends through the longitudinal axis 26, 79. At the bottom, the individual tube 74 is occupied by a like electrode 82 which extends over the same length, lies symmetrically with the central plane 81 and extends over about 100 degrees of angle. As FIG. 11 shows, further central planes 83, 84 are provided, corresponding to individual tubes 76, 77. In view of the foregoing explanation, there is no need further to explain the electrodes 86, 87, 88, 89.

A strip of copper plate a few centimeters wide is bent into a three-pointed star 91 as shown in FIG. 11. The sheet metal strip comprises three 8 mm wide individual segments, its arcuate flank 92 fitting against the electrode 82, while its arcuate flank 93 fits against the electrode 86 and its arcuate flank 94 fits against the electrode 88. The arcuate flanks are in each case connected to one another by bends 96, 97, 98. As can be seen, the arcuate flanks 92, 93, 94 extend from an angular point of view substantially as far as the associated electrodes so that a far-reaching close contact is achieved. The bends 96, 97, 98 project somewhat, as shown. The bend 96 is located in the middle of the length of the tube device 24. Extending upwardly from it is a copper connecting part 99. The connecting part 99 is connected by screws (separably) to a copper strip 101 which extends substantially horizontally to the intermediate flange device 21 where it is connected on the inside to one polarity of the connection 37 for high frequency energy.

The copper strip 101 extends also rightwardly and in the same way is adjacent the individual tubes of the tube device 24 which have like electrodes, a star and a copper connecting part.

The outer electrodes 76, 78, 79 in FIG. 11 are contacted by a copper ring 102 which bears on the apices of the electrodes 78, 87, 89. At 6 o'clock, the ring 102 is provided with a copper connecting piece 103. Its other downwardly directed end is galvanically connected to a copper strip 104. The connecting piece 103 according to FIG. 3 is in the left-hand zone of the tube device 24 so that the connecting pieces 99, 103 are sufficiently far apart from each other in order to avoid flash-over or stray capacitance. The copper strip 104 also extends to the tube device 24 located to the right of the intermediate flange device 21 and forms a like connection for this. Inside the intermediate flange device 21, the copper strip 104 is in a manner not shown galvanically connected to the other pole of the connection 37.

Therefore, if a high frequency voltage is applied to the copper strips 101 and 104 and if a laser gas is present in the individual tubes of the tube devices, then discharges occur between the electrode 78, 82; 87, 86; 89, 88.

If there are two tube devices 24 on either side of the intermediate flange device 21, then an electrical connection is made in this way.

If three intermediate flange devices 21, 22, 23 are provided according to FIG. 1, then there is a choice: for example, all high frequency connections 37, 41, 42 can be loaded or the HF connection 41 can be disregarded and only the connections 37, 42 loaded, in which case HF is supplied to the tube devices 24 located on the right and left of the intermediate flange devices 21, 23. It is readily possible to achieve the same effect also with other types of connections.

Figure 2:
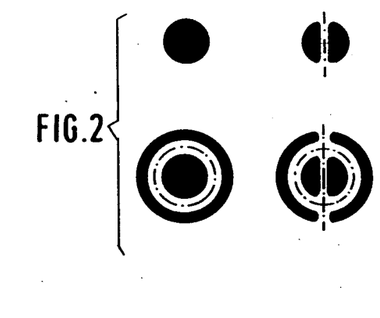
FIG. 2 shows the desired mode together with some undesired modes.

In the case of the embodiment according to FIG. 2—as also in the case of the embodiment shown in FIG. 1—it is ensured that the end flange devices 56, 57 do not tilt in respect of the geometrical longitudinal axis 26 because they are so held by the steel rods 62, 63, 64 which form a cage that the mirrors provided in the end flange devices 56, 57 retain their adjusted position even under conditions of continuous operation. It is also essential that the end zones of the steel rods are rigidly connected to the end flange devices 56, 57 via the fixing flanges 67, 68. Under conditions of continuous operation, it is assured that the steel rods 62, 63, 64 always have the same length even where there are variations in temperature, which can for example happen if the steel rods 62, 63, 64 are always kept at the same temperature, which can be achieved by various measures.

Figure 5:
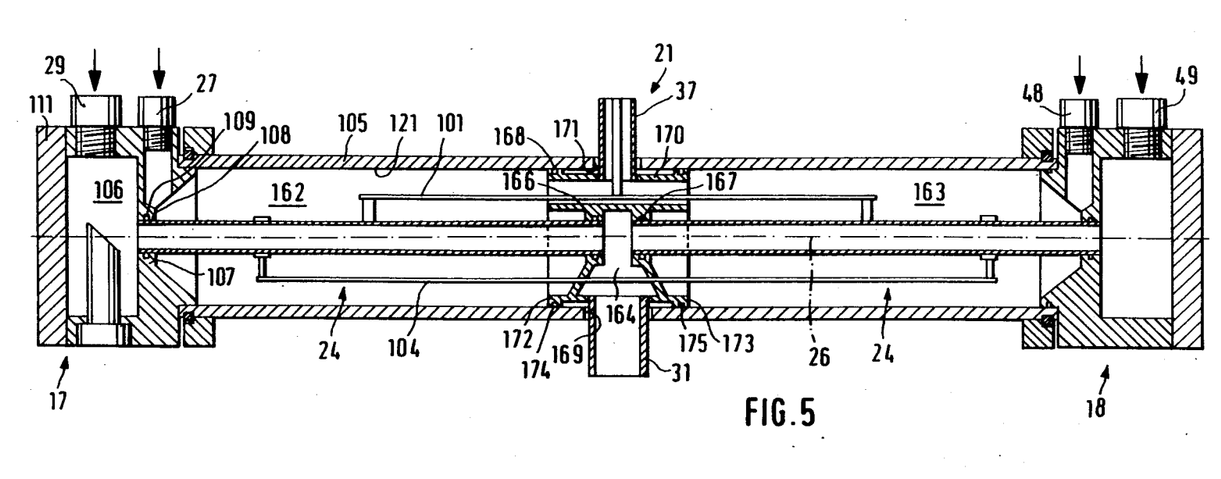
FIG. 5 is a longitudinal section through a device according to FIG. 3 but with a tube as the supporting device.

Along the lines of the solution of the problem, the steel rods 62, 63, 64 can also be replaced by a tube 105 having cut-outs, as already broached in FIG. 1 and as FIG. 5 shows in the case of a laser with two tube devices 24. In this case, the end flange device 17 known from FIG. 1 has the connection 27 for oil and the connection 29 for gas. The gas passes into a cavity 106 in which are located the 45° mirrors 32, 33 and the convex mirror 34 as indicated symbolically in FIG. 5. The individual tubes 74, 76, 77 embodied in the tube device 24 communicate with the cavity 106 on the left in FIG. 5. They are held by recesses in an end plate 107 in which there are circularly cylindrical bores 108. Let into the bores 108 is an O-ring gasket 109 so that a fluid-tight bushing is provided which does, however, permit of relative displacements of the end plate 107 in relation to the individual tubes 74, 76, 77 to allow for heat expansion. On the left, the cavity 106 is occluded by a gas-tight screwed on plate 111 so that together with the end plate 107 and the annular shell 111 a solid end flange device 17 is created which is short when viewed in an axial direction.

Figure 6:
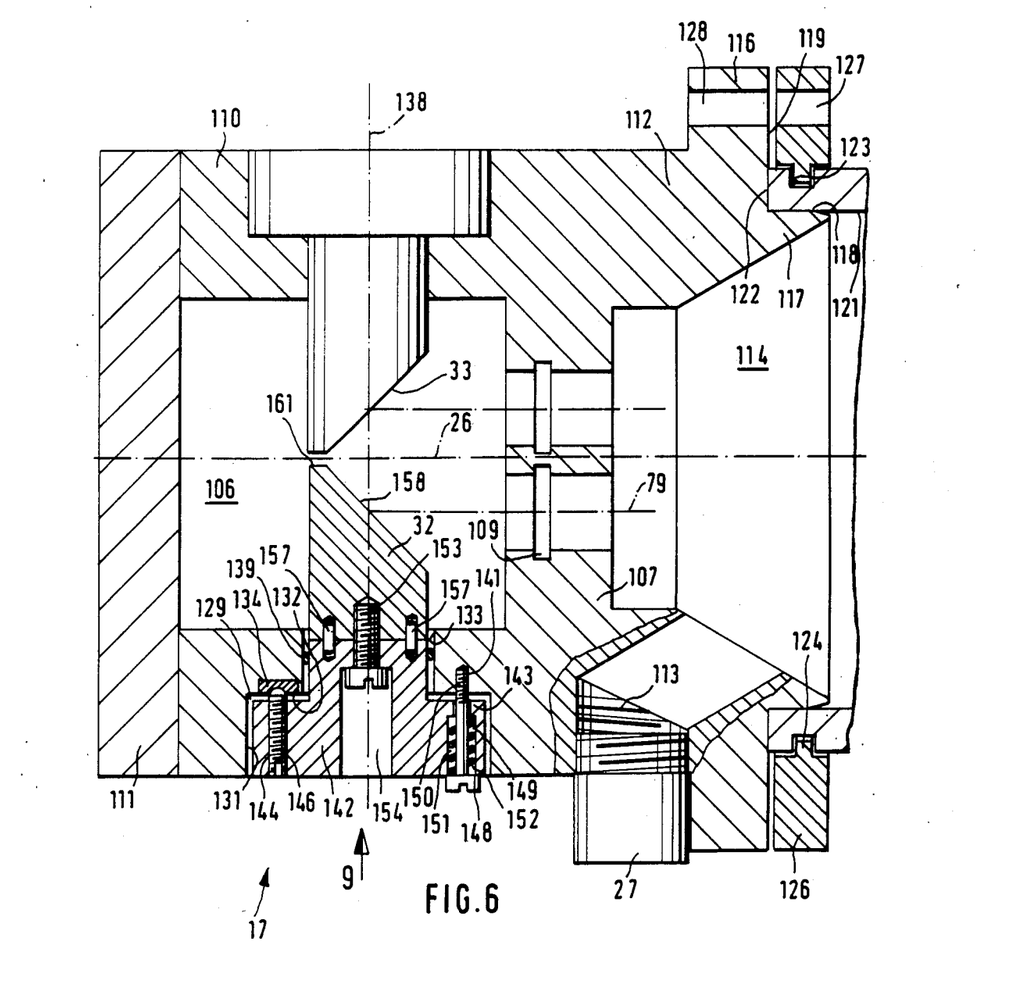
FIG. 6 shows on an enlarged scale the left-hand area of FIG. 5.
Figure 7:
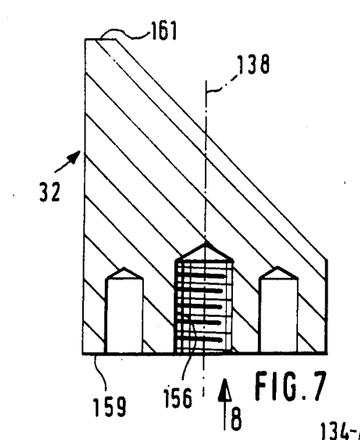
FIG. 7 shows as an individual part a mirror illustrated in FIG. 6.

On the right, the end plate 107 merges into a funnel-shaped rotationally symmetrical wall 112 which opens up to the right. Incorporated into this is a knee-shaped bore 113 which opens up rightwardly into the funnel 114 and which at the connection 27 guides incoming oil to the right. The wall 112 has a circularly symmetrical annular flange 116 which according to FIG. 6 is offset somewhat leftwardly in relation to the funnel tail 117. The funnel tail 117 has a circularly cylindrical coaxial peripheral face 118. The annular face 119 of the annular flange 116 and located on the right in FIG. 6 is located exactly radially in relation to the geometrical longitudinal axis 26. In its left-hand end zone, the honed inner face 121 of the tube 105, possibly with an interposed additional gasket, bears in fluid-tight fashion on the peripheral face 118. The left-hand end face 122 of the tube 105 is exactly radial to the longitudinal axis 26 and bears on the annular face 119 in the inner zone thereof. Thus, there is as a positive and very good connection between the end flange device 17 and the tube 105.

Figure 12:
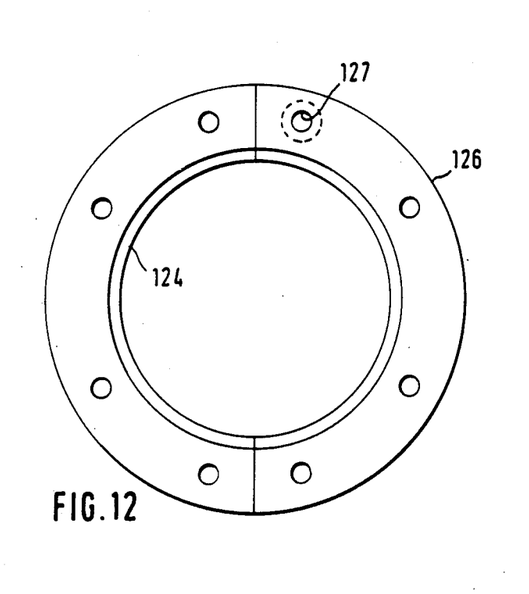
FIG. 12 is a front view of a flange ring.

In the region of the funnel tail 117, the tube has a peripheral groove 123 which is recessed from the outside. In this groove there is an inner circular rib 124 of a two-part flange ring 126 which is shown in FIG. 12 in a view from the right according to FIG. 6. The flange ring 126 is at a distance from the annular face 119. It is traversed by through bores 127 aligned with identical through bores 128 in the annular flange 116. In the latter is the shank of a draw-in bolt. The draw-in bolts, together with the nuts, pull the flange ring 126 leftwardly against the annular flange 116 so pulling the end face 122 up to the annular face 119. The result is a rigid connection between the tube 105 and the end flange device 17.

The mirrors 32, 33, 34 are provided in the end flange device 17. In order to obtain a mode of zeroth order, the mirror adjustment must be identical from the outset, because if this is not the case, then it will be wrong also at differing temperatures.

The design measures involved in the case of a mirror, namely the mirror 32, will be explained more precisely so that they will be readily transferable also to the other mirrors.

According to FIG. 6, there is in the annular shell 111 a stepped hole 129 which has on the outside a larger diameter annular wall 131, a step 132 parallel with the axis 26 and a smaller diameter annular wall 133. Let into the step 132 are three hard metal plates 134, 136, 137, the surfaces of which are aligned and at a right-angle to the radial plane 138. Also provided on the annular wall 133 is a fluid-tight O-ring 139.

The small hard metal plates 134, 136, 137 are staggered by in each case 120° in respect of one another. Three blind bores 141 which carry a female screwthread are let into the step 132 on the intermediate angle bisectors.

Figure 10:
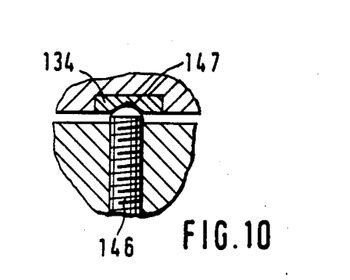
FIG. 10 is an enlarged detail from the bottom left-hand zone of FIG. 6.

Seated in the step hole 129 is a complementarily shaped base 142 which has in its annular zone 143 which is opposite the step 132 screwthreaded through bores 144 where these meet the hard metal plates 134, 136, 137. Screwed into the threaded through bores 144 are grub screws 146 which have at the back a recessed hexagonal socket and the inner end face of which bears on the hard metal plates 134, 136, 137. According to FIG. 10, there is in one hard metal plate 134 an outwardly open depression 147. If the end face of the relevant grub screw 146 is located in it, then this is a safeguard against the base 142 being able to twist by even very small amounts.

Screwed into the blind bores 141 are the threaded shanks 147 of headed screws 148. The other part of the shank lies in each case in a through bore 149 of which the larger diameter part 141 serves as a chamber for a coiled compression spring 152 which is biased at one end on the head of the headed screw 148 and at the other on the step illustrated, so forcing the base 142 upwards, according to FIG. 6, and this force pushes the end faces of the grub screws 146 against the hard metal plates 134, 136, 137.

By screwing the grub screws 146 in equally, the base 142 is caused to perform a linearly outwards movement. It moves linearly inwards when the grub screws 146 are screwed out and if the grub screws 146 are screwed in and/or out unevenly, and then the base 142 will perform tilting movements. Both movements can also be superimposed by differing screwing on the grub screws 146.

The mirror 32 is the exchangeable continuation of the smaller diameter raised portion of the base 142 and is connected to it by a central screw 153 which is screwed at one end into a central stepped through bore 154 in the base 152 and at the other in a threaded blind bore 156 in the mirror 32. Pins 157 projecting into both parts serve as a further safeguard against rotation. The underside 158 of the mirror 32 is finely machined and fits flush on the identically machined end face of the base 142.

Figure 8:
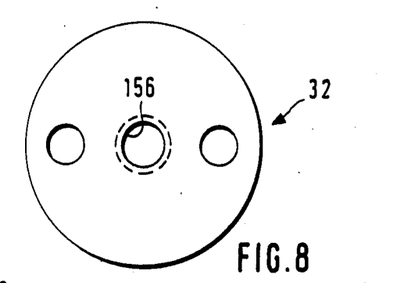
FIG. 8 is a view according to arrow 8 in FIG. 7.
Figure 9:
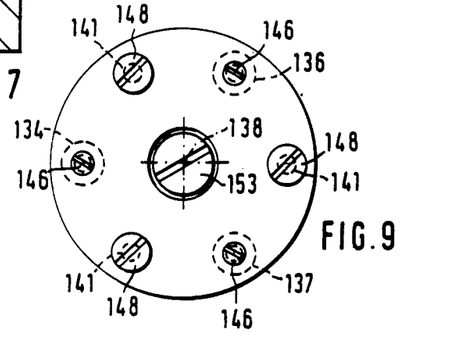
FIG. 9 is a view according to the arrow 9 in FIG. 6.

The mirror surface 158 is diamond polished and is at 45° to the geometrical longitudinal axis 79 of the individual tube 77. Instead of allowing the mirror surface 158 to fade out to a point, the corner zone there is capped off by a surface 161 which is parallel with the base surface 159. This surface 161 avoids having what would otherwise be a finely finishing surface the tip of which would only be pressed aside by the machining diamond and consequently an exactly plane mirror surface 158 would not be guaranteed. As FIG. 8 shows, the circumference of the mirror 32 is circular.

As a result of this arrangement, all mirrors can be adjusted afterwards from the outside with extreme accuracy.

Figure 4:
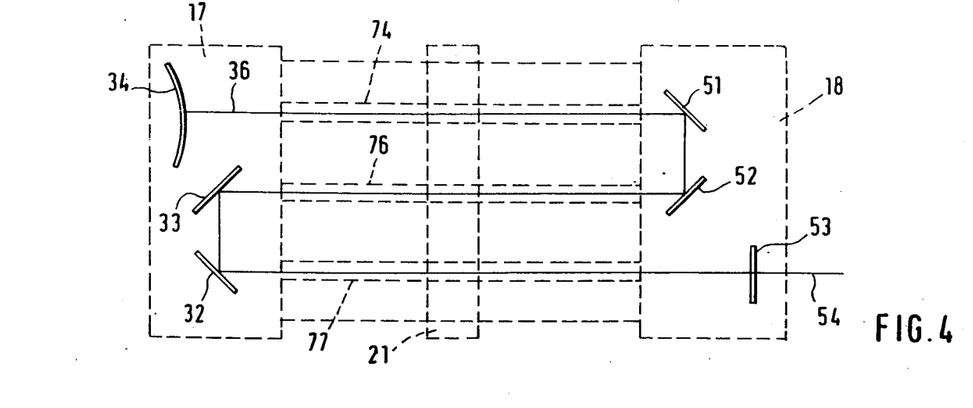
FIG. 4 is a view in one plane and opened up to show the principle of the beam path in the device according to FIG. 3.

In view of the exact description of the end flange device 17 according to FIG. 5, there is no need especially to describe the end flange device 18. As FIG. 4 shows, there are in it the 45° mirrors 51, 52 and the partially pervious mirror 53 and are adjustable in principle in the same way as the mirrors of the end flange device 17.

The intermediate flange device 21 according to FIG. 1 has the upwardly directed connection 37 for high frequency. Furthermore, there are two connections 31 of which one is shown as being directed downwardly. In reality, however, there are two connections, one of which points upwardly at a right-angle to the plane of the drawing in FIG. 5 while the other points downwards at a right-angle to the plane of the drawing in FIG. 5. FIG. 5 does not show the connection 28 for oil as this connection is already known from FIG. 1. In reality, in the case of the embodiment shown in FIG. 5, it is likewise pointing downwards and communicates both with the interior 162 and also the interior 163 so that cool oil arriving through the connections 27, 48 can flow out again from the connection 28.

By reason of the cavity 164 communicating only with the left-hand or right-hand ends of the tube device 24, the gas passes out of the individual tubes 74, 76, 77 from the cavity 164 into the connection 31 which serves as a gas outlet. Seals 166, 167 in the body of the intermediate flange device 21 prevent oil passing out of the interior 162, 163 into the cavity 164. The seals 166, 167 correspond to the O-ring 109. The mounting and seal as the same as there, so that if necessary relative movements adequate to cope with head expansion can take place between the individual tubes 74, 76, 77 on the one hand and the intermediate flange device 21.

As can be seen from FIG. 5, the copper strip 101 lies in an open port 168. The same pressure therefore always prevails in the interior spaces 162, 163, even if oil at different pressures happens to be delivered to the connections 27, 48. Naturally, the same also applies to the use of a different fluid such as for example water or air.

Provided for the connection 31 is a circular cut-out 169 which has a larger diameter than the connection 31 so that it does not touch it. The connection 31 will have been screwed into the body of the intermediate flange device 21 once the intermediate flange device 21 has been brought into the correct location.

The same applies to the connection 37 which traverses a circular cut-out 171. Finally, the same applies to the oil connection 28 not shown in FIG. 5.

The intermediate flange device 21 has a coaxial circularly cylidnrical outer shell 171 which according to FIG. 5 has an external bead on the outside of its left-hand end and an identical outer bead 173 on the right. The peripheral face of the outer bead 172, 173 is at a small distance from the inner face 121, the distance being within the range of hundredths of a millimeter. Due to the lack of metal:metal contact, there is no readily conductive heat bridge. Also, the intermediate flange device 21 is capable of axial displacement in the tube 105 by amounts relative to the heat expansion requirement.

So that the fluid present in the interior spaces 162, 163 and serving for cooling purposes does not pass to the outside, square-section rings are let into the outer beads 172, 173 which bear in sealing-tight fashion on the inner face 121. All in all, therefore, also the intermediate flange device is disengaged from the tube 105 from the point of view of heat elongation, just as the intermediate flange device 58 of the embodiment in FIG. 3 is in the same way disengaged from the steel rods 62, 63, 64.

If the invention permits of an outstanding mode, then this also means that the ability to focus the working beam 54 remains excellent. If it were possible, by tiling the end flange devices 17, 18 towards each other to arrive for example at an RO PHl-1 mode, then the focussing capacity would be impaired at the same time by the factor 2, the most vital magnitude for the machining process, namely the output per sq.cm would go down and thus the machining speed would also be reduced.

It would also be possible to pass the tube 105 as in FIG. 3 around the fixing flanges 59, 61, 67, 68 so that the tube 105 serves only to carry fluid and to provide HF screening, but does not take over any or hardly any rigidity functions.

I claim:

1. In a folded longitudinal flow $CO_2$ laser with an output of at least several hundred Watts, having:
   a geometrical longitudinal axis,
   a rectilinear tube device of dielectric material containing $CO_2$, parallel to said longitudinal axis,
   said tube device having end zones,
   a solid metallic end flange device at each end zone of said tube device,
   a flange end portion in each of said end flange devices extending substantially at right angles to said longitudinal axis and having apertures for said end zones of said tube device,
   a cavity in each of said end flange devices which communicates with said tube device,
   deflecting mirrors accommodated by said cavity,
   a gas connecting aperture in each of said end flange devices which communicates via said cavity with said tube device,
   gas-tight sealing devices between said tube device end zones and said flange end portions,
   high frequency electrodes extending longitudinally relative to said tube device, and
   a mechanical supporting device for said end flange devices;
   the improvement in which:
   said tube device comprises a plurality of individual tubes between said end flange devices, disposed serially per fold path,
   at least one intermediate flange device supports said individual tubes and is aligned with said end flange devices,
   said intermediate flange device has a gas connecting aperture,
   said intermediate flange device has a cavity aligned with said individual tubes and said gas connecting aperture,
   a gas tight sealing device is provided between said intermediate flange device and said individual tubes,
   said end flange devices have peripheral zones,
   said supporting device is flexurally-resistant and extends parallel to said longitudinal axis and has two end zones which are rigidly fixed in said peripheral zones in a flexurally-resistant fashion and without clearance,
   said intermediate flange device is carried by said supporting device in such a manner that said intermediate flange device is moveable lengthwise relative to said supporting device to the extent required by heat expansion, and
   said individual tubes are supported in such a manner that said individual tubes are moveable relative to said end flange devices and said intermediate flange device to the extent required by heat expansion.

2. Device according to claim 1, wherein said tube device is disposed symmetrically of said geometrical longitudinal axis.

3. Device according to claim 1, wherein said individual tubes are composed of inorganic glass.

4. Device according to claim 1, wherein said individual tubes are of equal length.

5. Device according to claim 4, wherein said individual tubes have the same inside and outside diameter and are of the same material.

6. Device according to claim 1, wherein said intermediate flange device has a high frequency connection and connecting lines extend from said intermediate flange device to said high frequency electrodes.

7. Device according to claim 6, wherein said high frequency electrodes lie symmetrically with planes that pass through said geometrical longitudinal axis and said individual tubes each have inner and outer high frequency electrodes, and wherein the outer electrode of an individual tube is connected by a common outer ring to a first of said connecting lines, and the inner electrode of an individual tube is connected by a common inner ring to a second of said connecting lines.

8. Device according to claim 7, wherein said common inner ring is folded like a star having as many points as there are associated individual tubes, the end zones of the points being disposed between adjacent tubes while the flanks of each of said star points follow the circular segments of said inner electrodes.

9. Device according to claim 1, wherein the outer contours of said end flange devices are substantially circularly cylindrical in relation to said geometrical longitudinal axis.

10. Device according to claim 1, wherein the outer contours of said intermediate flange device is substantially circularly cylindrical in relation to said geometrical longitudinal axis.

11. Device according to claim 1, wherein said supporting device has means for providing a constant temperature fluid for maintaining said supporting device at desired temperature.

12. Device according to claim 11, wherein said fluid is air.

13. Device according to claim 11, wherein said fluid is transformer oil.

14. Device according to claim 11, wherein said fluid is water.

15. Device according to claim 1, wherein said supporting device comprises a plurality of circularly-cylindrical, axially-parallel rods, said rods having end zones fixed to said end flange devices at the same angular spacing from one another, and wherein said intermediate flange device has two radial collars spaced apart from each other, and said rods traverse said radial collars in a non-tilting manner.

16. Device according to claim 15, wherein three rods are provided.

17. Device according to claim 15, wherein four rods are provided.

18. Device according to claim 1, wherein said supporting device is an internally finely-machined supporting tube, the end zones of which are rigidly secured to said end flange devices, and wherein said supporting tube has cut-outs for connectors of said intermediate flange device, and said intermediate flange device has radial flanges for securing said intermediate flange device in said supporting tube.

19. Device according to claim 18, wherein said cut-outs are round.

20. Device according to claim 19, wherein said cut-outs are circular.

21. Devices according to claim 1, wherein said intermediate flange device has circular connectors.

22. Device according to claim 21, wherein said connectors are at the same angular intervals.

23. Device according to claim 21, wherein two diametrically opposed connectors are provided for laser gas and a third connector is provided for said high frequency electrodes.

24. Device according to claim 23, wherein two diametrically opposed connectors are provided for laser gas and a third connector is provided for said high frequency electrodes.

25. Device according to claim 23, wherein a connector is provided for fluid.

26. Device according to claim 24, wherein a connector is provided for fluid.

27. Device according to claim 18, wherein said supporting tube is a standard hydraulic tube.

28. Device according to claim 1, wherein at least two mirrors are provided in said end flange device, each of said mirrors having a base traversing a wall of said end flange device, said base and said mirror having an adjusting device, with said wall as an abutment.

29. Device according to claim 28, wherein said adjusting device comprises both a tilting portion and a longitudinal adjustment portion.

30. Device according to claim 29, wherein said adjusting device comprises three adjusting screws disposed around the middle of said base.

31. Device according to claim 30, wherein said adjusting screws are thrust screws.

32. Device according to claim 31, wherein hard metal inserts composed of a metal harder than said end flange devices are embedded in said end flange devices, and said thrust screws have end faces bearing on said hard metal inserts.

33. Device according to claim 30, wherein said adjusting screws are disposed at equal angular intervals around a center.

34. Device according to claim 29, wherein said adjusting device comprises adjusting screws and a spring pretensioning device operating against the direction of action of said adjusting screws.

35. Device according to claim 34, wherein said spring pretensioning device comprises a thrust spring, a screw head, and a bore, and wherein said thrust spring is braced at one end against said screw head and at its other end against the bottom of said bore.

* * * * *